F. ZIGANEK.
OVEN FOR COOKING STOVES.
APPLICATION FILED AUG. 30, 1909.

969,828.

Patented Sept. 13, 1910.
2 SHEETS—SHEET 1.

Witnesses:
N. O. Gettins
B. C. Brown

Inventor:
Ferdinand Ziganek
By
Attorneys

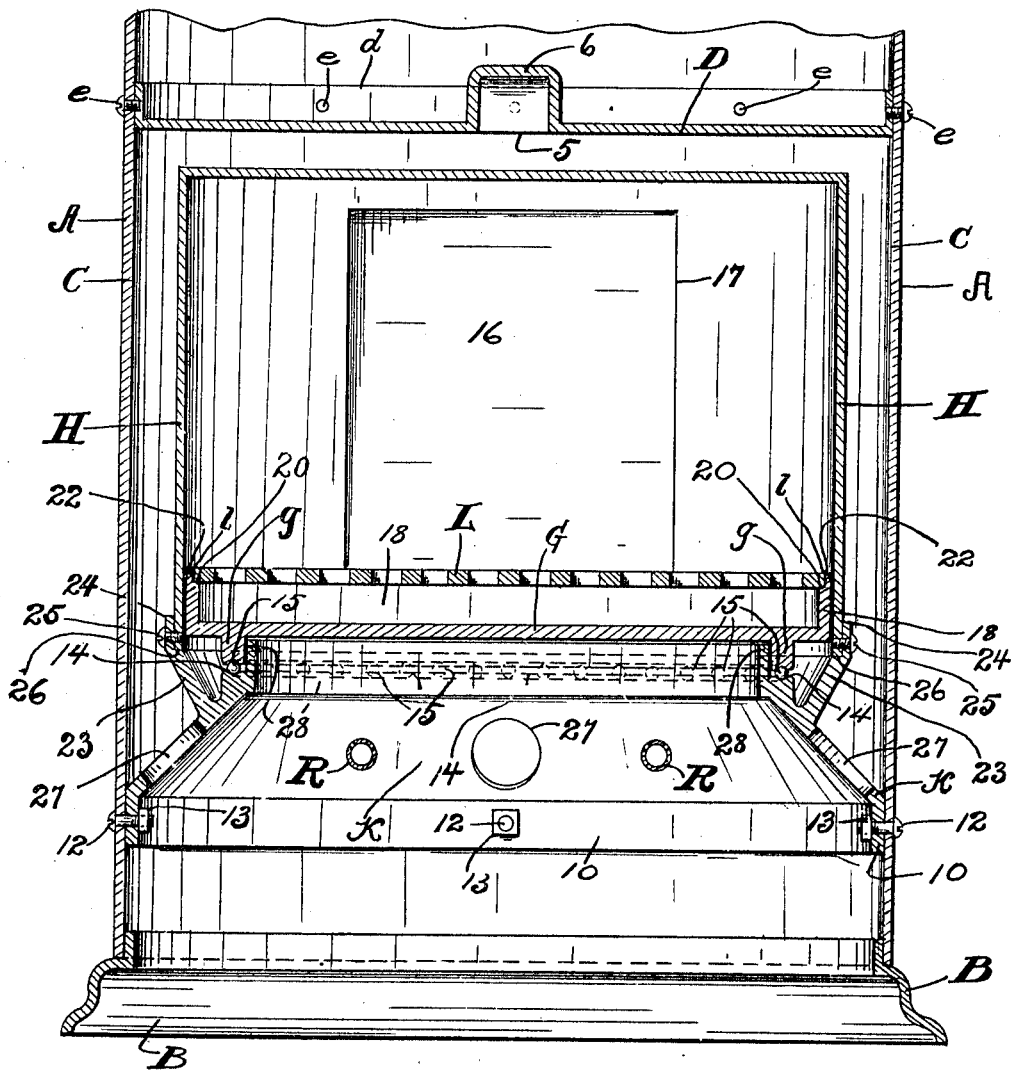

UNITED STATES PATENT OFFICE.

FERDINAND ZIGANEK, OF CLEVELAND, OHIO, ASSIGNOR, BY MESNE ASSIGNMENTS, TO THE REVOLVING STOVE COMPANY, OF CLEVELAND, OHIO, A CORPORATION OF OHIO.

OVEN FOR COOKING-STOVES.

969,828. Specification of Letters Patent. Patented Sept. 13, 1910.

Application filed August 30, 1909. Serial No. 515,173.

*To all whom it may concern:*

Be it known that I, FERDINAND ZIGANEK, a citizen of the United States of America, residing at Cleveland, in the county of Cuyahoga and State of Ohio, have invented certain new and useful Improvements in Ovens for Cooking-Stoves; and I hereby declare the following to be a full, clear, and exact description of the invention, such as will enable others skilled in the art to which it pertains to make and use the same.

This invention relates to improvements in ovens for cooking stoves, and pertains more especially to a bake-oven which is heated by the operation of heating burners placed under the bottom of the oven.

The primary object of this invention is to provide the body of a cooking-stove with a bake-oven which comprises a rotary bottom and has its upright and top walls formed by a stationary hood-shaped casing.

Another object is to provide a base for the oven and to have anti-friction bearings interposed between the rotary bottom and the said base so as to render the bottom capable of being rotated with facility.

Another object is to render the aforesaid casing removable upwardly independently of the said bottom.

Another object is to support both the said casing and the oven-bottom from an annular section which forms the aforesaid base and is arranged within and attached to a casing instrumental in the formation of a heating chamber which is formed next externally of and extends around and over the oven and has a top wall which is provided centrally with an outlet so that the products of combustion arising from the heating burners will pass from under the oven-bottom to and up the outer side of and over the casing of the oven before they can pass into the said outlet.

Another object is to have the casing of the stove-body and the oven substantially cylindrical in horizontal section and to have the oven arranged centrally of and concentric relative to the said casing so as to render the said parts as compact as practicable.

Another object is to provide a bake-oven of the character indicated which is simple and durable in construction and whose component parts are readily assembled.

With these objects in view, and to the end of realizing other advantages hereinafter appearing, this invention consists in certain features of construction, and combinations and arrangement of parts, hereinafter described, pointed out in the claims and illustrated in the accompanying drawings.

Figure 1:
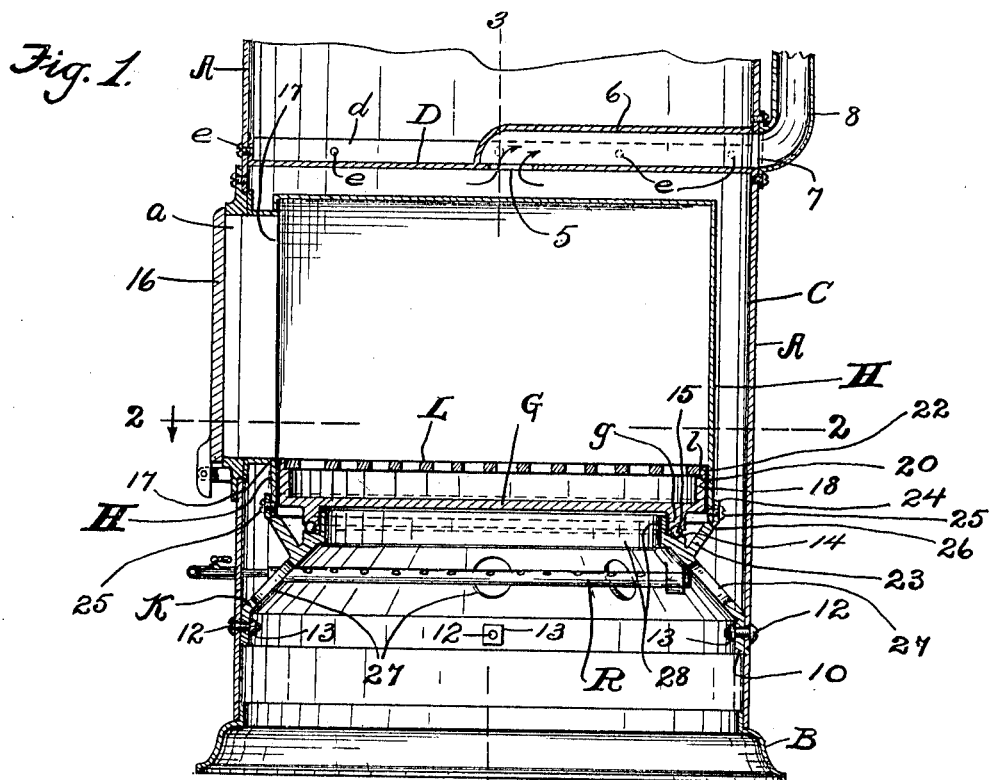
Figure 2:
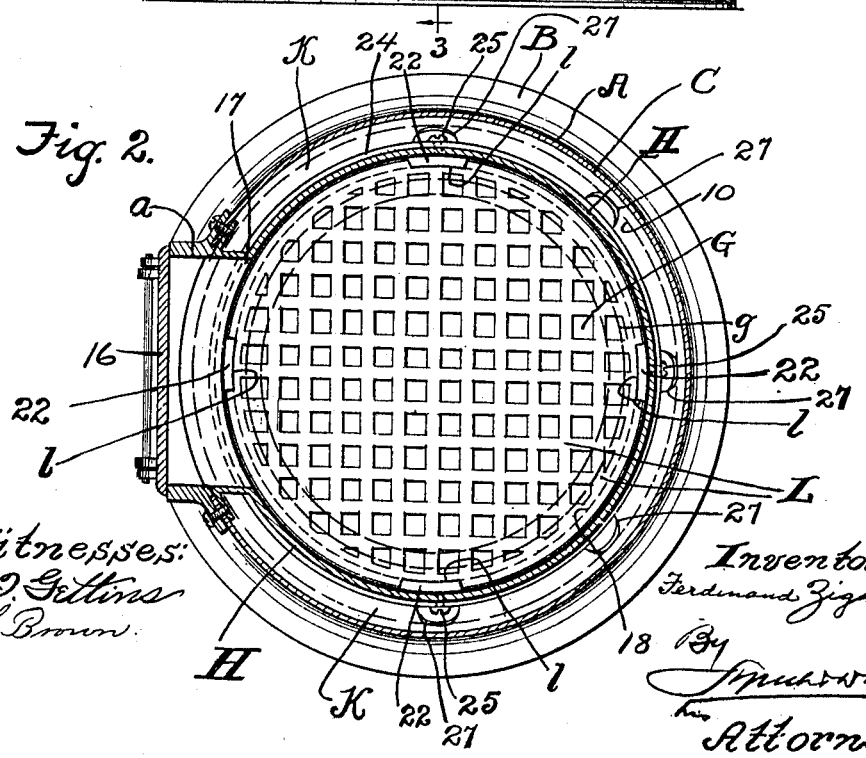

In the said drawings, Figure 1 is a central vertical section of the larger portion of a cooking stove provided with a bake-oven embodying my invention. Fig. 2 is a horizontal section on line 2—2, Fig. 1, looking downwardly. Fig. 3 is a vertical section on line 3—3, Fig. 1, looking in the direction indicated by the arrow. Fig. 3 is drawn on a larger scale than Figs. 1 and 2.

The body of the cooking-stove illustrated comprises a vertically arranged or upright substantially cylindrical metal casing A which, at its lower end, rests upon a base B. The casing A forms the surrounding wall of an oven-heating chamber C which has a top wall D consisting of a metal plate which is arranged horizontally within and transversely of the casing A, which plate is provided at its upper side and internally of the said casing with an upwardly projecting flange $d$ which extends circumferentially of the casing and is removably secured to the latter by screws $e$. The chamber C is provided centrally of its top wall D with an outlet which is formed by a hole 5 in the said wall, which hole is in communication with a flue 6 formed on the said wall and employed in conducting off products of combustion passing through the said outlet, which flue is in communication with a lateral aperture 7 formed in the casing A and arranged to discharge into a flue 8 attached to the said casing and employed in conducting the products of combustion to a chimney (not shown).

Within and centrally of the chamber C, and a suitable distance below the top wall D of the said chamber, is arranged my improved bake-oven which, as shown, is substantially circular in horizontal section and comprises a rotary circular bottom G and a stationary hood-shaped casing H which forms the upright and top walls of the oven. The oven is arranged therefore within and centrally of the casing A and spaced from the top wall D of the chamber C.

A base for the oven is provided, which base consists preferably of a downwardly flaring annular section K arranged at the bottom of the oven and within the casing A. The section K is provided at its lower end with a vertically downwardly projecting flange 10 which is secured preferably removably by suitably applied bolts 12 and nuts 13 to the casing A. The bottom G is of course arranged horizontally and provided at its under side with a downwardly projecting annular flange $g$ which is arranged concentrically relative to the axis of the bottom.

The oven-base K is provided directly under the flange $g$ with an upwardly facing annular seat 14 which is arranged concentrically relative to the said flange. Anti-friction bearings, such, for instance, as anti-friction balls 15, are interposed between the seat 14 and the flange $g$. The oven-bottom is therefore mounted on or supported from anti-friction bearings and can therefore rotate with facility.

The casing A is provided at the front of the stove with a lateral doorway $a$ which is closed by a suitably applied door 16, and the oven-casing H is substantially cylindrical in horizontal section and provided with a flanged lateral opening 17 which is in communication with the said doorway so that upon opening the door access is had through the said doorway and the said opening to the interior of the oven. The bottom G is provided at its upper side with an upwardly projecting annular flange 18 which extends circumferentially of and is arranged concentrically relative to the axis of the bottom, and the casing H extends circumferentially of the said bottom and around the said flange. The flange 18 at its upper end has an upwardly facing annular seat 20 for a foraminated shelf L and operative connection between the said shelf and the oven-bottom is established by the engagement of lugs 22 formed on the said flange with recesses $l$ formed in the said shelf.

The oven-base K is provided externally and in suitable proximity to the seat 14, with an upwardly flaring annular wing 23 which is provided at its upper end with an upwardly projecting annular flange 24 which surrounds or extends circumferentially of the lower end of the oven-casing H which is secured to the said flange preferably by suitably applied screws 25. The wing 23 is provided at the inner side of its flange 24 with an upwardly facing annular seat 26 upon which the oven-casing H rests. It will be observed therefore that the oven-casing H is removably secured to the oven-base K and consequently supported from the casing A of the body of the stove, that the oven-base K and the oven-casing H, upon removing the top wall D and the screws 12 and nuts 13, are free to be hoisted together upwardly out of the external casing A, and obviously upon the removal of the oven-casing H and oven-base K from within the casing A the oven-casing H, by withdrawing the screws 25, is rendered removable from the oven-bottom G to afford proper access to the oven-bottom for removal or repairs. Obviously the detachability of the oven-casing H from the oven-base K is important to permit the renewal or repair of the oven-bottom G when necessary.

Two heating burners R which are applied in any approved manner are arranged and spaced laterally below the oven-bottom G, and the oven-base K is provided between the wing 23 and the casing A with lateral perforations 27 which are spaced circumferentially of the said base. Obviously the products of combustion arising from the heating burners R during the operation of the burners and employed in heating the oven-bottom G pass through the perforations 27 and upwardly within the chamber C and around the oven-casing H, and must pass over the latter to reach the outlet 5 of the said chamber. I would also remark that the oven-base K is provided at the inner side of the flange $g$ of the oven-bottom with an upwardly projecting annular flange 28 which is arranged concentric relative to the axis of the oven-bottom and forms a guard for obstructing the passage of products of combustion between the last-mentioned flange and the seat 14.

What I claim is:—

1. The combination, with a bake-oven for a cooking-stove, which oven has a rotary bottom which is provided at its under side with a downwardly projecting annular flange arranged concentrically relative to the axis of the said bottom, and a stationary casing forming the top and upright walls of the oven, of a base for the oven, which base is provided with an annular seat under the aforesaid flange and has an upwardly projecting annular flange extending circumferentially of the inner side of the first-mentioned flange, and anti-friction bearings interposed between the said seat and the first-mentioned flange.

2. The combination, with a bake-oven for a cooking-stove, which oven has a rotary bottom, and a hood-shaped casing forming the top and upright walls of the oven, of a base for the oven, which base has an upwardly flaring annular wing provided with a seat for the aforesaid casing, said base being provided with an annular seat arranged under and concentrically relative to the axis of the oven-bottom, and anti-friction bearings interposed between the said seat and the oven-bottom.

3. In a bake-oven for a cooking-stove, a suitably supported rotary circular bottom which is provided at its upper side with an upwardly projecting annular flange arranged concentrically relative to the axis of the said bottom, a hood-shaped casing forming the top and upright walls of the oven and extending circumferentially of the said flange, and a foraminated shelf supported from and operatively connected with the said flange.

4. The combination, with the body of a cooking-stove, which body comprises a heating chamber having its surrounding wall formed by a substantially cylindrical upright casing which is provided with a lateral doorway, said chamber having a top wall arranged within and removably secured to the said casing; a flue communicating with the said chamber at the upper end of the chamber; means for heating the said chamber, and a door for closing the aforesaid doorway, of an oven arranged centrally of the aforesaid chamber and provided with a lateral opening which is in communication with the aforesaid doorway, and a base for the oven, which base is arranged within and removably secured to the aforesaid casing.

5. The combination, with the body of a cooking-stove, which body comprises a heating chamber having its surrounding wall formed by an upright casing which is provided with a lateral doorway, said chamber having a top wall which is provided with an outlet; a flue communicating with the said outlet; means for heating the said chamber, and a door for closing the aforesaid doorway, of an oven arranged centrally of the aforesaid chamber and provided with a lateral opening which is in communication with the aforesaid doorway, which oven has a rotary circular bottom supported from the aforesaid casing, said oven having its top and upright walls formed by a casing which is supported from the first-mentioned casing and is provided with the aforesaid opening.

6. The combination, with the body of a cooking-stove, which body comprises a heating chamber having its surrounding wall formed by an upright casing which is provided with a lateral doorway, said chamber having a top wall which is provided with an outlet and arranged within and removably secured to the said casing; a flue communicating with the said outlet; means for heating the said chamber, and a door for closing the aforesaid doorway, of an oven arranged centrally of the aforesaid chamber and provided with a lateral opening which is in communication with the aforesaid doorway, which oven has a rotary bottom, said oven having its top and upright walls formed by a casing provided with the aforesaid opening, and a base for the oven, which base is arranged within and attached to the first-mentioned casing and supports the second-mentioned casing and the oven-bottom.

In testimony whereof, I sign the foregoing specification, in the presence of two witnesses.

FERDINAND ZIGANEK.

Witnesses:
C. H. DORER,
B. C. BROWN.